United States Patent
Nordell et al.

(10) Patent No.: US 10,099,397 B2
(45) Date of Patent: Oct. 16, 2018

(54) WATERJET STREAM CATCHER

(71) Applicant: PaR Systems, Inc., Shoreview, MN (US)

(72) Inventors: Adam Nordell, Apple Valley, MN (US); Andrew McChain, Minneapolis, MN (US)

(73) Assignee: PAR SYSTEMS, LLC, Shoreview, MN (US)

( * ) Notice: Subject to any disclaimer, the term of this patent is extended or adjusted under 35 U.S.C. 154(b) by 289 days.

(21) Appl. No.: 14/619,059

(22) Filed: Feb. 10, 2015

(65) Prior Publication Data

US 2015/0298342 A1    Oct. 22, 2015

Related U.S. Application Data

(60) Provisional application No. 61/938,117, filed on Feb. 10, 2014.

(51) Int. Cl.
*B26F 3/00* (2006.01)
*B24C 9/00* (2006.01)
*B05B 14/00* (2018.01)

(52) U.S. Cl.
CPC .............. *B26F 3/008* (2013.01); *B05B 14/00* (2018.02); *B24C 9/006* (2013.01)

(58) Field of Classification Search
CPC . B02C 13/1807; B02C 13/185; B02C 19/066; B05B 15/0412; B24C 9/00; B24C 9/003; B24C 9/006; B26F 3/008
See application file for complete search history.

(56) References Cited

U.S. PATENT DOCUMENTS

| | | | | |
|---|---|---|---|---|
| 3,730,040 A | * | 5/1973 | Chadwick | B24C 9/00 83/177 |
| 4,354,641 A | * | 10/1982 | Smith | B02C 19/066 164/5 |
| 4,698,939 A | * | 10/1987 | Hashish | B26F 3/008 181/265 |
| 4,758,284 A | | 7/1988 | Todd | |
| 4,920,841 A | * | 5/1990 | Johnson | B24C 9/00 451/40 |
| 5,295,425 A | * | 3/1994 | Hediger | B26F 3/008 83/177 |
| 9,358,668 B2 | * | 6/2016 | Hashish | B24C 5/02 |

FOREIGN PATENT DOCUMENTS

| | | |
|---|---|---|
| EP | 0408819 A1 | 1/1991 |
| WO | 200018551 A2 | 4/2000 |

OTHER PUBLICATIONS

International Search Report and Written Opinion, dated May 13, 2015, for corresponding International Application No. PCT/US2015/015290, filed Feb. 10, 2015.
PaR Systems, Inc., Water; Jet Catcher, Box Style, sold Dec. 2005.
Communication from the European Patent Office for European patent application No. 15706117.7, dated Aug. 3, 2017.

* cited by examiner

*Primary Examiner* — Timothy V Eley
(74) *Attorney, Agent, or Firm* — Steven M. Koehler; Westman, Champlin & Koehler, P.A.

(57) ABSTRACT

A catcher for a fluid stream and a method of capturing a fluid stream from a nozzle and dissipating the energy therein includes receiving the fluid stream into a housing through an aperture; and deflecting the fluid stream obliquely within the housing in one or more preselected directions.

31 Claims, 14 Drawing Sheets

WATERJET STREAM CATCHER

BACKGROUND

The discussion below is merely provided for general background information and is not intended to be used as an aid in determining the scope of the claimed subject matter.

Waterjet systems for cutting various forms of material are well known. In one known system, the waterjet cutter includes a large bath where a plate to be cut is disposed above the surface of the water in the bath. The waterjet cutter is commonly used to cut plates to obtain the workpiece where the waterjet stream is generally oriented towards the water bath. In this manner, energy of the waterjet stream after cutting through the material of the plate is dissipated in the water bath.

Another form of waterjet cutter includes a waterjet stream catcher that has an aperture in a housing that is spaced apart from an end of a nozzle of the waterjet cutter. The portion of the workpiece to be cut is disposed between the end of the waterjet nozzle and the aperture in the housing. The housing is fixedly connected to the waterjet nozzle so as to maintain the fixed relationship between the end of the nozzle and the aperture of the housing. In this manner, although the waterjet nozzle can be moved in up to six degrees of freedom in order to make a selected cut in the material to obtain the workpiece, the housing will track with the nozzle such that the waterjet stream after cutting the workpiece will enter the housing through the aperture. A vacuum hose is typically connected to the housing to remove the water and commonly at least some of the material cut from the housing in order to allow continuous operation.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. It is one of the objects of the invention to improve the prior art roof assembly.

Aspects of the invention include a catcher for a fluid stream and a method of capturing a fluid stream from a nozzle and dissipating the energy therein includes receiving the fluid stream into a housing through an aperture; and deflecting the fluid stream obliquely within the housing in one or more preselected directions.

A catcher for a fluid stream including a replaceable wear resistant component made from a wear resistant material. A housing with an aperture is configured to receive a fluid stream into the housing, the housing having at least one structure configured to support the replaceable wear resistant component, the wear resistant component having a portion configured to cooperate with a structure of the housing and hold the wear resistant component in a selected orientation and fixed position with respect to the aperture to deflect the fluid stream in a selected direction within the housing.

The wear resistant component can comprise a deflecting member having a planar surface, wherein engagement of the deflecting member with the structure orients the planar surface underneath the aperture in a fixed oblique position with respect to the aperture to deflect the fluid stream in a selected direction within the housing. In one embodiment, the deflecting member comprises a disc, while in another the deflecting member can have a plurality of planar surfaces, for example in the shape of a block although other polygonal shapes having planar surfaces when viewed in cross-section (octagon, hexagon, triangle, etc) can also be used. In this manner, at least a first planar surface is oriented to receive the fluid stream when the deflecting member is mounted in a first position in the housing and wherein a second planar surface is oriented to receive the fluid stream when the deflecting member is mounted in a second position in the housing. Repositioning extends the life of the deflecting member.

The housing can be in the form of a tube and the structure supporting the disc can comprises a cylindrical insert having a center bore, the disc having a circumferential edge configured to engage an end of the insert. An end of the insert can have a portion defined by a plane oblique to an axis of the center bore, where the disc can be of size to be inserted into an end of the tube and supported on a side opposite the insert in the fixed oblique position. In one embodiment, the side opposite the insert is planar. A tubular housing allows the catcher to be compact when making cuts on a workpiece with limited space.

In another embodiment, the wear resistant component comprises a cylindrical insert having a center bore and an end surface defined by a plane oblique to the an axis of the center bore. The structure of the tubular housing can help hold the insert in a fixed position where an inner surface (bore) of the insert is oriented obliquely to at least some of the fluid stream. The end can include a partial rim extending axially beyond the end surface so as to hold a deflecting member as described above. The deflecting member is configured to deflect the fluid stream down the bore. The insert typically will include an aperture opening to the center bore and is of size to align with the aperture in the housing.

When the deflecting member is block shaped the first and second planar surfaces face in opposite directions. The perimeter sides can be of equal length, each perimeter side being oriented orthogonal to the planar surface. In one embodiment, the deflecting member has four perimeter sides of equal length, where one or more opposed perimeter sides of the deflecting member can each be configured to engage opposed corresponding structures in the housing. In this manner, the deflecting member is configured to be repositionable to any one of a plurality of positions, wherein the at least one structure, and preferably opposed structures, hold the deflecting member in each of the plurality of positions.

If desired, the catcher can comprise a second deflecting member, and the housing can include at least one second structure configured to support the second deflecting member in a selected orientation and fixed position. The structure and the second structure can be configured to support the deflecting member and second structure, respectively, to receive the fluid stream from the aperture and direct the fluid stream to the second deflecting member.

In one embodiment, the second structure is configured to support at least a portion of the second deflecting member to receive the fluid stream if the fluid stream cuts through the deflecting member. This overlap of the deflecting members minimizes the chances of wear upon the inner surface of the housing.

Optionally, the deflecting member and the second deflecting member are of size and shape so as to be interchangeable within the housing so as to maximize the use of each of the deflecting members. When each of the deflecting members is configured to be repositionable to any one of a plurality of positions, where the corresponding structure holds the associated deflecting member in each of the plurality of positions this too can maximize use of each deflecting member in addition or in the alternative to interchanging the positions of the deflecting members.

In one advantageous embodiment, the deflecting member is made of polycrystalline diamond, which prior to the present invention it believed this material was not previously used or suggested to be used in catchers.

Another aspect of the invention is a method of capturing a fluid stream from a nozzle and dissipating the energy therein. The method includes receiving the fluid stream into a housing through an aperture; and deflecting the fluid stream obliquely within the housing in a preselected direction.

The method can include deflecting the fluid stream with a planar surface on a deflecting member held in a fixed position in the housing. Optionally, the method can also include repositioning the deflecting member so that a different portion of the planar surface deflects the fluid stream. Repositioning of the deflecting member can include removing the deflecting member from at least a portion of the housing and reinserting the deflecting member back into the housing wherein a same structure supports the deflecting member in each different position of the deflecting member in the housing. Repositioning such as by removal and reinsertion can effectively rotate the deflecting member so that a different portion of the deflecting member is exposed to the fluid stream. Repositioning the deflecting member in general can effectively rotate the deflecting member so a different planar surface faces the fluid stream and/or repositioning the deflecting member can also in general effectively rotate the deflecting member so a different portion of the planar surfaces faces the fluid stream.

As indicated above, the deflecting member can comprise a disc such as of constant radius or a block of material having perimeter sides of equal length, or have one or more of the features described above.

The method can include deflecting the fluid stream obliquely in a plurality of preselected successive direction, which reduces the energy in the fluid stream. In a preferred embodiment, deflecting comprises deflecting the fluid stream in each preselected direction with a planar surface on a replaceable deflecting member held in a fixed position in the housing.

Another aspect of the present invention is a catcher for a fluid stream that includes first and second deflecting members. A housing having an aperture receives the fluid stream and includes a first structure to hold the first deflecting member in a fixed position at an oblique angle with respect to the fluid stream and to direct the fluid stream to the second deflecting member. The housing further includes a second structure to hold the second deflecting member in a fixed position at an oblique angle with respect to the fluid stream from the first deflecting member.

Yet another aspect is a catcher for a fluid stream having a tubular housing that includes an aperture configured to receive the fluid stream which opens to a bore along an axis of the tubular housing. A deflecting member in the shape of a disc supported in the housing at an oblique angle is configured to receive the fluid stream and deflect the fluid stream down the bore. In a preferred embodiment the planar surface is made of polycrystalline diamond.

Another aspect is a catcher for a fluid stream including a housing having a aperture. A receiver having a slot is configured to receive the fluid stream and direct the fluid stream into the aperture, the slot having a width dimension longer than a depth dimension being coplanar with the width dimension.

Any of the above described features can be provided in these latter two catchers.

DETAILED DESCRIPTION OF ILLUSTRATIVE EMBODIMENTS

Figure 1:
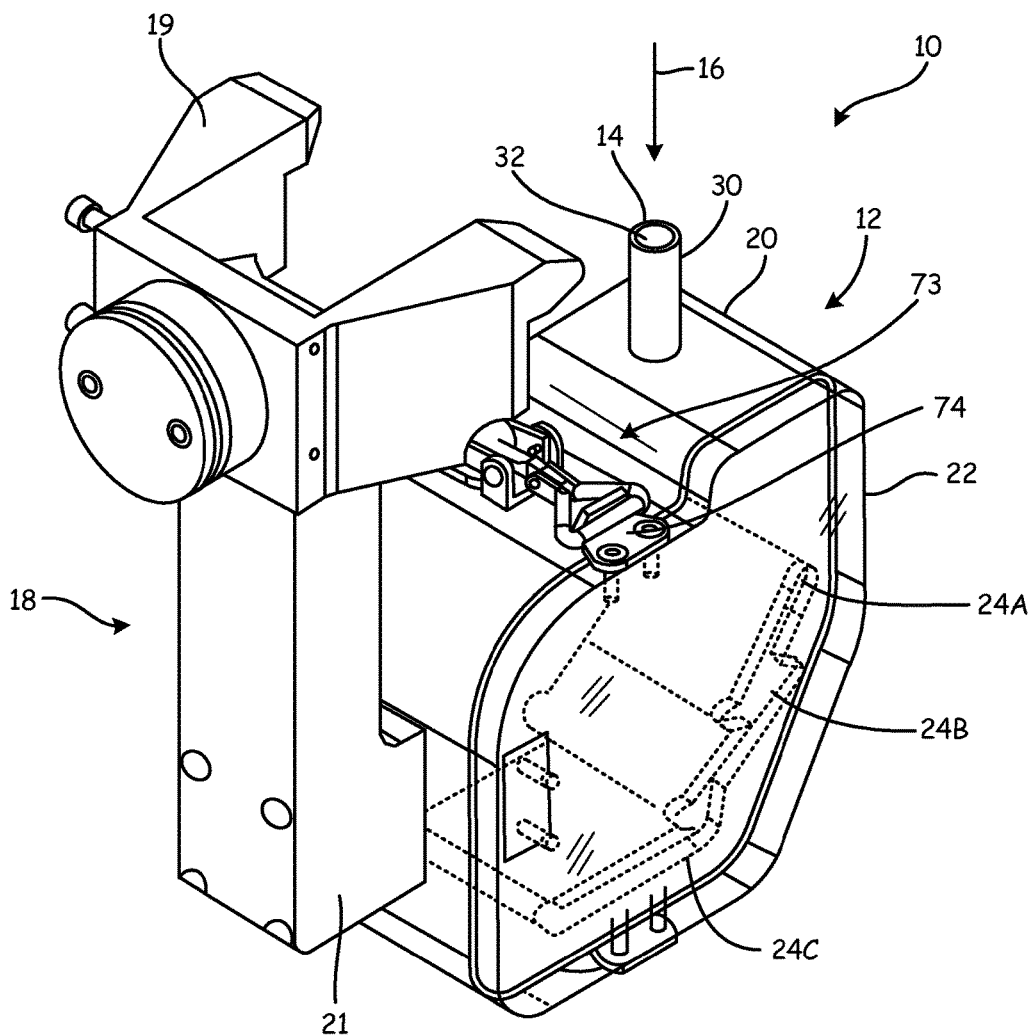
FIG. 1 is a perspective view of an embodiment of a catcher.
Figure 2:
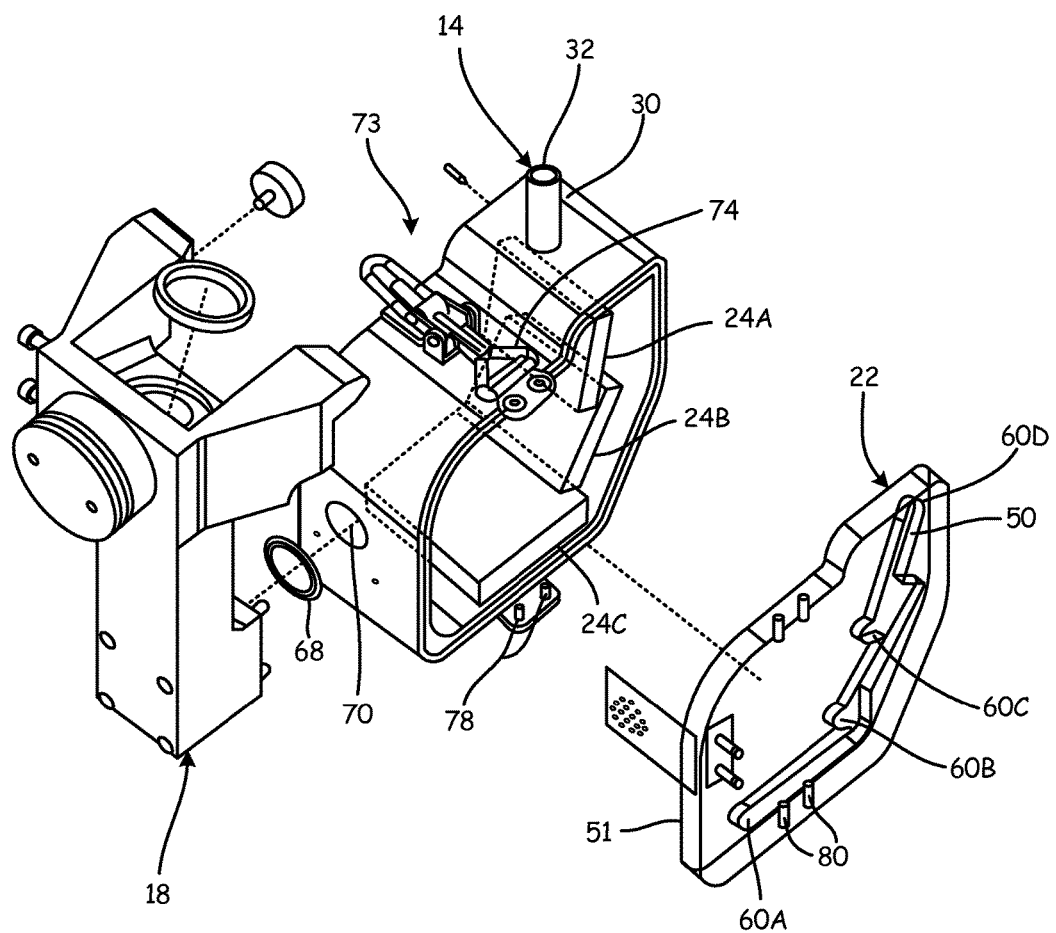
FIG. 2 is a partial exploded view of the embodiment of FIG. 1.
Figure 3:
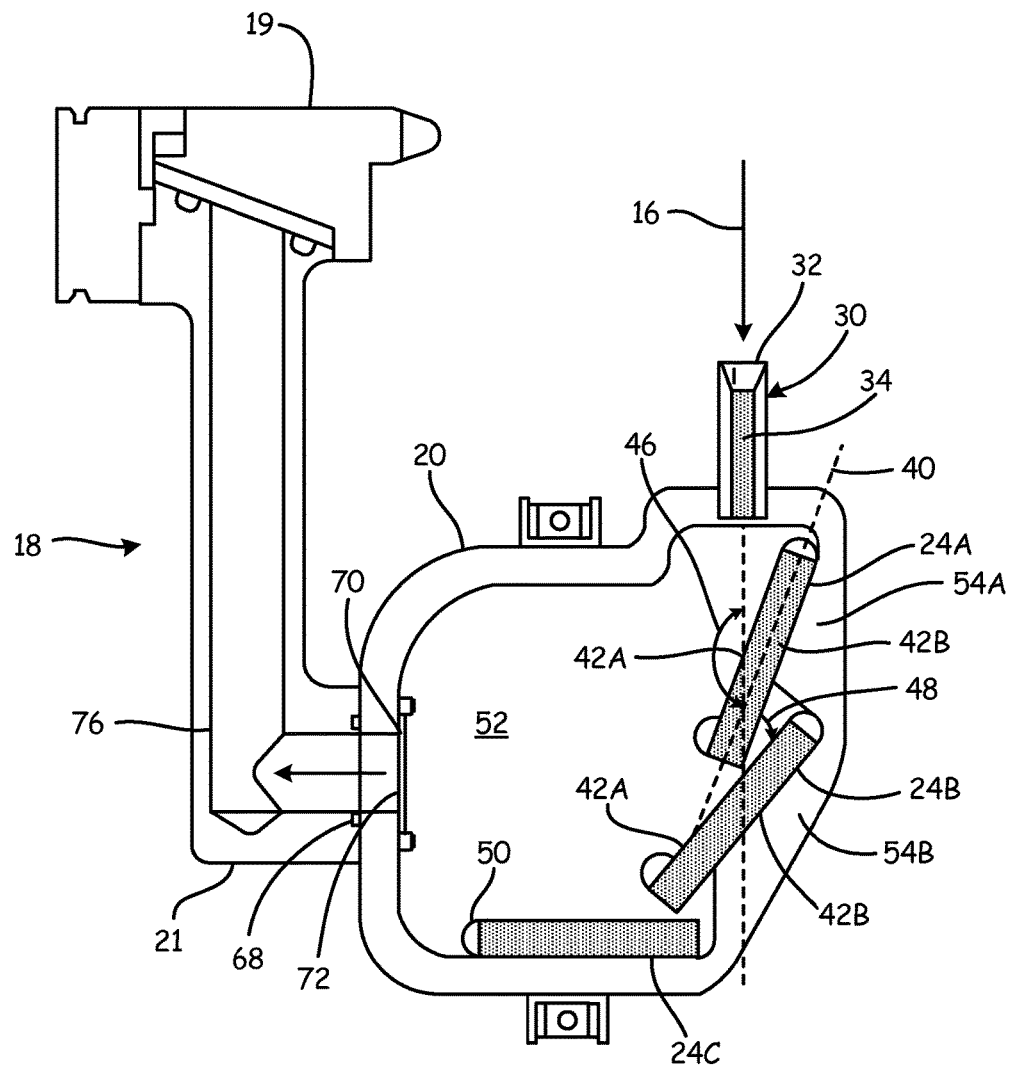
FIG. 3 is a side elevational view of the embodiment of FIG. 1 with a cover removed.

FIGS. 1-3 illustrate an exemplary embodiment of a catcher 10 for a fluid (liquid) stream having aspects of the present invention. The catcher 10 includes a housing assembly 12 having an aperture 14 that is configured to receive a stream from a nozzle represented by arrow 16. A mount 18 is secured to the housing such as at end 21, while another portion of the mount such as end 19 is secured to a support that directly or indirectly also supports the nozzle 16. In this manner, as the nozzle 16 moves so as to cut material (not shown) disposed between the nozzle 16 and the aperture 14, the aperture 14 will remain in a fixed relation to the nozzle 16 so as to receive the fluid stream from the nozzle 16 as the nozzle 16 and the catcher 10 move.

The housing assembly 12 includes a housing body 20 and a removable cover 22. Within the housing body 20 is a plurality of deflecting members 24 so as to receive the fluid stream through the aperture 14. The deflecting members 24 are preferably fixedly, but removably supported by structures within the housing 12 so as to remain in a substantially fixed position independent of the orientation of the catcher 10 to the force of gravity. Being in a fixed configured position by structures of the housing 12, the deflecting members 24 receive the fluid stream and deflect the stream in a selected or predictable direction within the housing body 20 so as to dissipate the energy therein. In FIG. 3, the fluid stream is mainly deflected to the left due to the inclined orientation of the deflecting member 24A relative to the direction of the fluid stream entering the housing body 20. This is in contrast to catchers that use a plurality of balls that fill the housing body in a random manner, in which case the stream entering the body is not deflected in a selected or predicted manner since the balls are not individually supported by structures in the housing body.

Referring also to FIG. 3. in the embodiment illustrated, the receiving aperture 14 is embodied as an inlet receiver 30. The receiver 30 can be made from an erosion resistant material such as but not limited to boron carbide or tungsten carbide. In one embodiment, the receiver 30 is a nozzle commonly used to eject the fluid stream, but here it is being used as a fluid stream receiver. The receiver 30 includes an opening 32 comprising the aperture 14 that reduces down to a bore 34 that in turn directs the fluid stream into the housing body 20. The flared opening 32 and bore 34 work together to direct the fluid stream from the fluid nozzle in a predictable manner. As the fluid nozzle 16 moves over the material to be cut, the fluid stream, abrasive material and the material that has been cut contained therein deflects in a direction opposite to the movement of the fluid nozzle 16 and catcher 10. The slightly deflected fluid stream is captured by the sidewalls of the flared opening 32, which deflects, if necessary, the fluid stream toward the bore 34. Deflection of the fluid stream upon the side walls of the flared opening 32 will dissipate a small amount of energy of the fluid stream. In a preferred embodiment, the side walls of the flared opening 32 comprise a conical surface about a longitudinal axis of the bore 34.

The receiver 30 and through bore 34 provided therein directs the fluid stream in a predictable manner toward a first of the deflecting members 24. In an advantageous embodiment, as illustrated, each of the deflecting members 24 is substantially identical to each other. In the embodiment illustrated, each of the deflecting members 24 comprises a square block of material that is symmetric about a plane 40 so as to have two oppositely facing surfaces 42A and 42B.

As indicated above, a plurality of deflecting members 24 is advantageously present in the catcher 10. In the embodiment illustrated, three deflecting members 24A, 24B and 24C are illustrated; however, this should not be considered limiting in that any number of deflecting members can be used, including just one inclined deflecting member if desired. For example in the embodiment of FIG. 4, the housing body 20A is configured with grooves 50A so as to hold deflecting plates 24A and 24C in a particular, inclined manner relative to the previous deflecting member if one is present or relative to the bore 34 through which the fluid stream enters the housing body 20A. Grooves can be provided in a cover not illustrated, but similar to grooves illustrated in FIG. 2, to correspond with the grooves 50A in the body 20A to further help hold the deflecting plates 24A and 24C in the desired particular position.

When significant wear has occurred in plate 24A, the plate 24A can be interchanged with plate 24C, oriented as desired to have the fluid stream contact surfaces 42A or 42B of plate 24C as desired. In another method of operation, plate 24A can be simply replaced if desired, while plate 24C remains in place or is flipped over to expose surface 42B, if desired.

Figure 4:
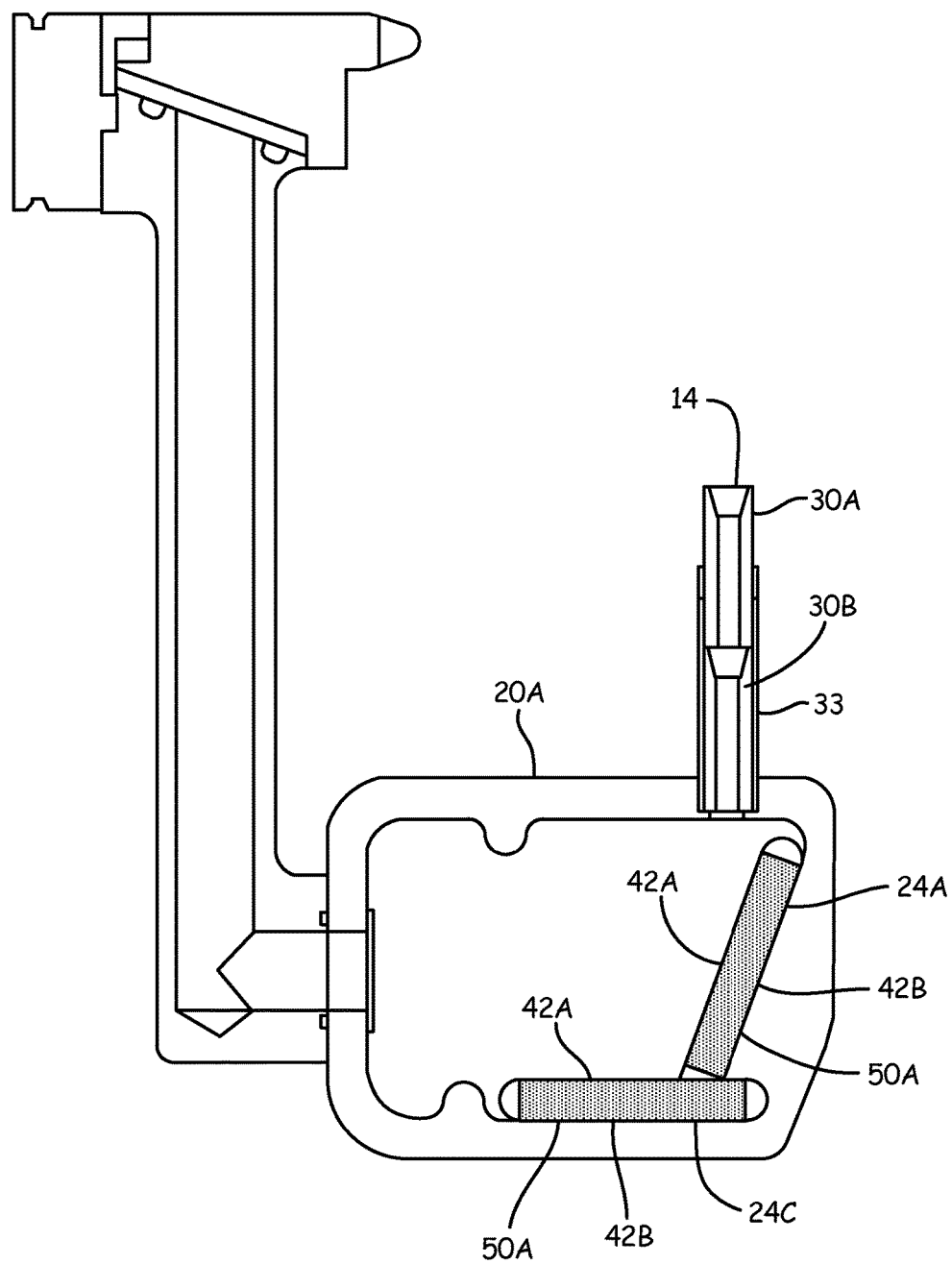
FIG. 4 is a side elevational view of an embodiment of a catcher having two deflecting members.

The embodiment of FIG. 4 also illustrates that the receiver 30 can comprise two elements 30A and 30B to help further dissipate energy in the fluid stream entering the aperture 14. In the embodiment illustrated, the receivers 30A and 30B are supported in position by a support tube 33 joined to body 20A.

Referring to the embodiment of FIG. 3, the fluid stream exits the bore 34 in a predictable manner into the housing assembly 12 and contacts, in the embodiment illustrated, deflecting member 24A upon surface 42A. The deflecting member 24A is oriented and held by the structures of the housing body 20 such that the surface 42A intersects with a longitudinal axis of the fluid stream exiting the though bore 34. In the embodiment illustrated, the deflecting member 24 is held at an angle of 160 degrees indicated by a double arrow 46, although the angle of orientation 46 can be selected depending upon the operating conditions such as but not limited to water stream velocity, water stream pressure, the abrasive material present in the water stream, material of the deflecting member 24A etc.

In one respect, the use of the plurality of deflecting members 24 allows the energy of the fluid stream to be dissipated in stages across the surfaces of the deflecting members 24; however, in the orientations illustrated, deflecting member 24A dissipates a significant amount of the energy in the water stream. In another respect, the plurality of deflecting members 24 provides redundancy as the water catcher 10 is used for a period of time during fluid cutting. In other words, eventually the fluid stream exiting the through bore 34 will wear through the deflecting member 24A and eventually start contacting the surface 42A of the second deflecting member 24B. Hence, the use of deflecting members 24A and 24B provides redundancy in order to allow the fluid stream cutter to cut for a longer period of time without stopping to reconfigure or replace the deflecting members 24. In the embodiment illustrated, the deflecting member 24B is fixed at an angle of approximately 14 degrees indicated by double arrow 48, although this angle of orientation should not be considered limiting.

Upon cutting or wearing through the deflecting member 24A and typically although not always, causing initial wear upon deflecting member 24B, an operator can stop the water cutting operation and remove the cover 22 from the housing body 20 so as to allow access to the deflecting members 24. Since the deflecting members 24 are each identical to each other, the operator can then rotate the position of the deflecting members 24 to different positions without having to replace the deflecting members, at least initially. For instance, after the deflecting member 24A has been cut through or notched and wear has started to occur on deflecting member 24B, the operator can move the deflecting member 24B to the position of deflecting member 24A (hence closer to the inlet tube 30), while also moving the deflector member 24C to the prior position of deflector member 24B. The deflecting member 24A having the notch can be then located in the prior position of deflecting member 24C or replaced. It should be understood that the foregoing is but one manner in which to rotate the deflecting members 24 and should not be considered limiting. In addition, if desired, the operator can change any one of the deflecting members such that the outwardly facing surface 42B is oriented so as to face the fluid stream with the oppositely facing surface 42A oriented so as to face away from the fluid stream.

Referring back to FIG. 1, it can be seen that receiver 30 is not centered along a center line bisecting the housing body 20 but rather is offset being closer to a back wall of the housing body 20 than the cover 22. The offset causes the fluid stream to impinge upon deflecting member 24A (and some or all the downstream deflecting members 24B and 24C) also offset from a centerline bisecting the deflecting member 24A. Such location of the receiver 30 relative to the deflecting member(s) 24A-24C is optional but is advantageous, particularly when the deflecting member(s) 24A-24C has edges that are equal in length such as the square block in the illustrative embodiment. Such shape allows the deflecting members 24A-24C to be removed, rotated and inserted back in the housing body 20. Since the receiver 30 is offset from the centerline of the deflecting members 24A-24C, wear upon the deflecting members 24A-24C, particularly deflecting member 24A, will not occur in the same spot from its previous position in the housing body 20. With a square block as illustrated, the deflecting members 24A-24C can be rotated to four different positions where wear upon the deflecting members 24A-24C will occur in four different areas. With the ability to flip the deflecting members 24A-24C so that face 42B can also be oriented to receive the fluid stream wear can occur in 8 different areas on the deflecting members 24A-24C, particularly when the deflecting member is located in the position of deflecting member 24A. Various forms of pins, protrusions, recesses or flanges can comprise the structures used to fix the orientation of each of the deflecting members 24A-2C in the housing body 20. In an advantageous embodiment as illustrated, grooves 50 are provided in an inwardly facing surface 51 of the cover 22 as well as a back surface 52 of the housing body 20 facing the cover 22. Each of the grooves 50 are dimensioned to be substantially the same width as the deflecting members 24A-24C and also are of a length to receive the entire edge of the deflecting member 24A-24C therein. In this manner, the deflecting members 24A-24C are supported along opposed edges in order to securely fix the desired orientations of each deflecting member 24A-24C. The housing body 20 can also include protrusions indicated at 54A and 54B that are substantially flat and contact a significant portion of the planar surfaces 42A or 42B, the protrusions 54A and 54B thus provide additional support for the deflecting members 24A and 24B against the forces of the fluid stream directed at it. In the embodiment illustrated, each of the grooves 50 includes an end portion such as indicated at 60A, 60B, 60C and 60D. These partial circular end portions 60A-60D are due to the rotating machining cutting element used to cut the grooves 50 within the surface of the housing body 20 and cover 22. Depending upon the techniques used to manufacture the housing body 30 and cover 22 such end portions 60A-60D may not be present.

Since the fluid stream is directed so as to cause predictable wear on the deflecting members 24, damage to the housing assembly 12 is significantly reduced or prevented. A problem with some prior art deflecting members contained within a housing yield an unpredictable deflection which could deflect the fluid stream towards the housing and cause wear thereupon.

The slurry contained within the housing assembly 12 is removed though an outlet aperture 70 typically under a vacuum. If desired, a filter screen 72 can be provided to inhibit large particles from exiting the inner housing body 20. The mount 18 includes an inner bore 76 through which the slurry of water, workpiece material and deflecting member material can be transported. The mount 18 is secured to the housing body 20 about the outlet aperture 70 wherein a seal 68 can be provided if necessary.

The cover 22 is removably attached to the housing body 20 with a suitable fastener(s) herein illustrated as a latch mechanism 73 that engages a hook 74 secured to cover 22. Aligning pins 78 that extend into suitable apertures 80 provided in the cover 22 help align the cover 22 upon the housing body 20 such that the groove(s) 50 provided in the cover 22 support each of the deflecting members 20A-24C.

Figure 5:
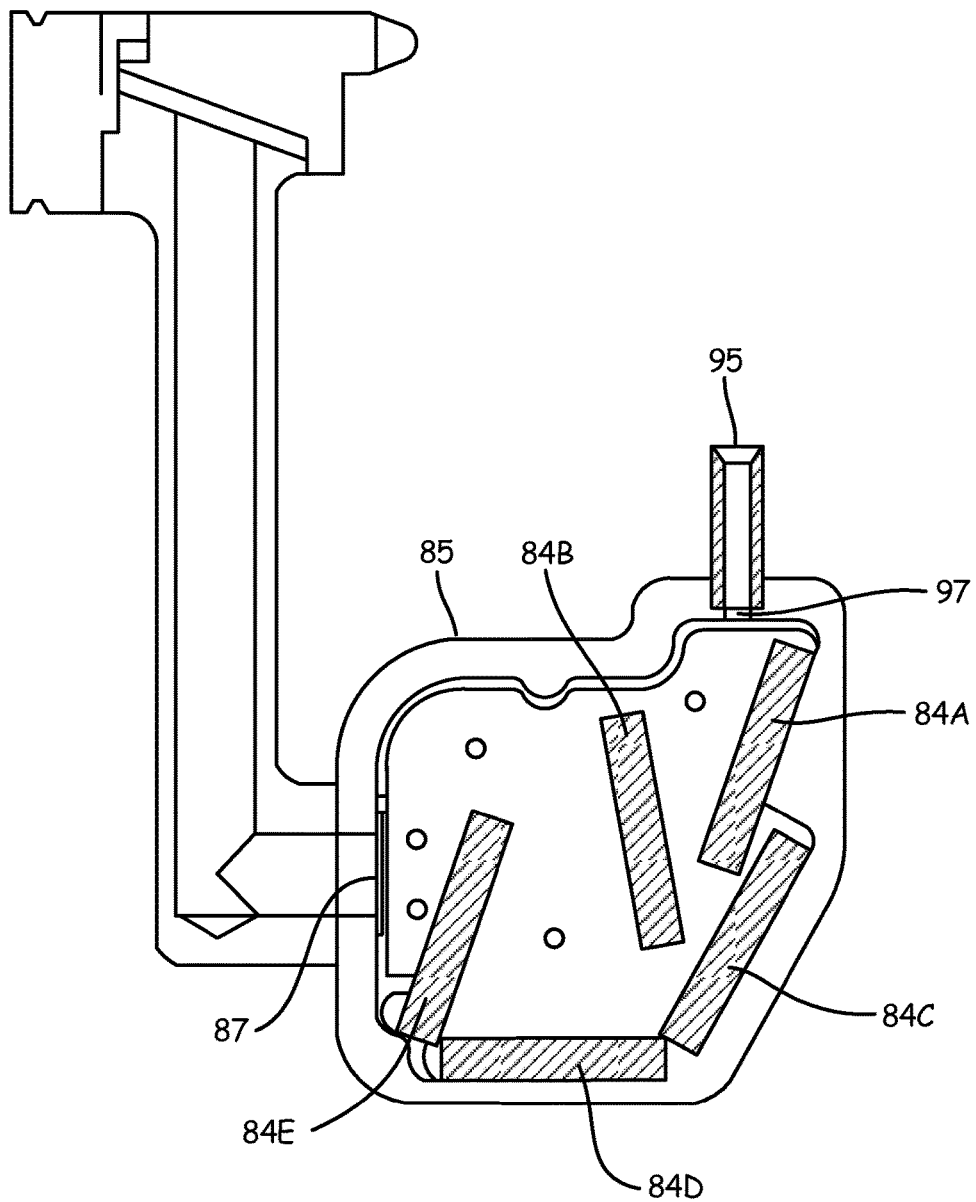
FIG. 5 is a side elevational view of an embodiment having five deflecting members.
Figure 6:
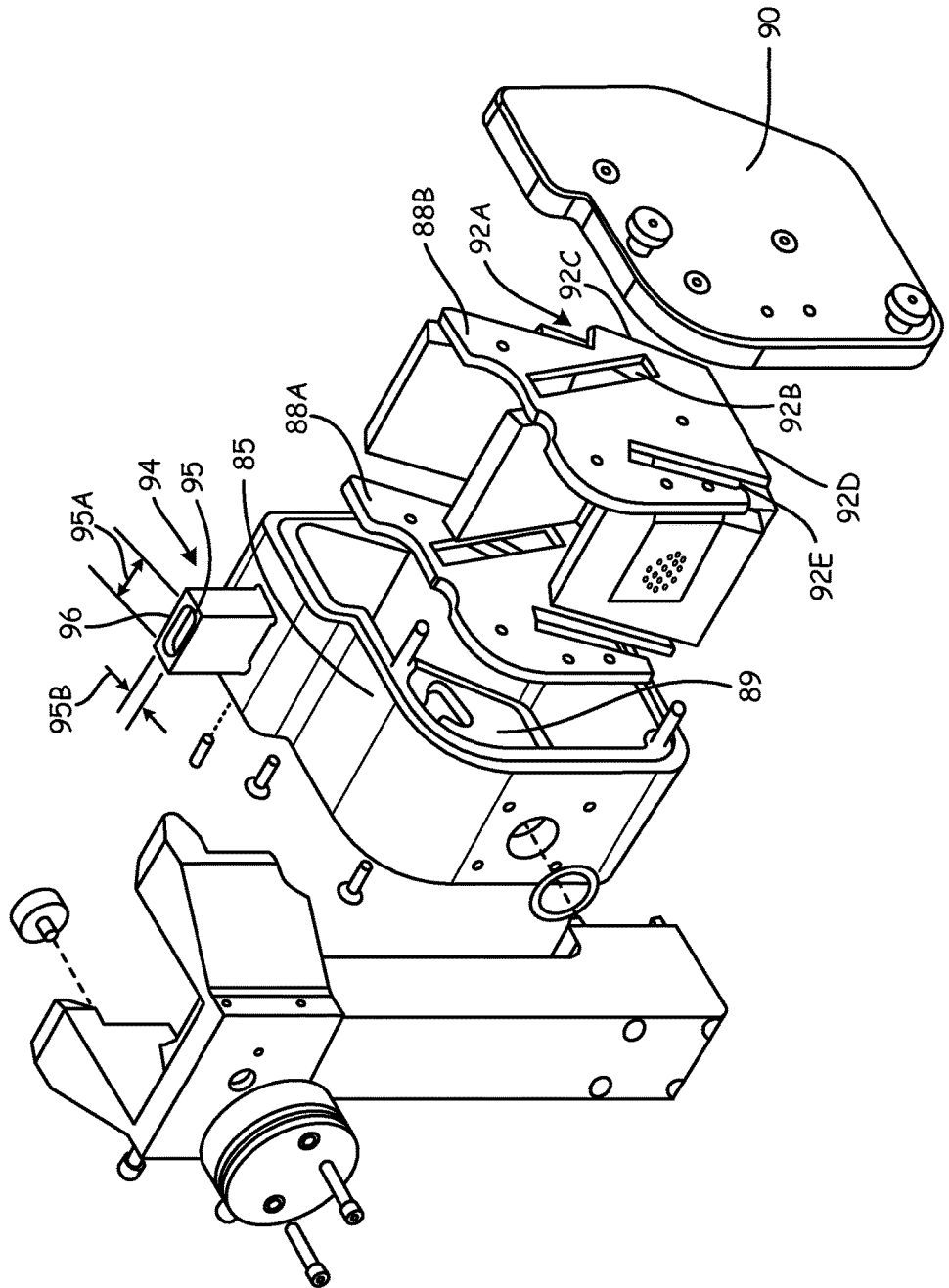
FIG. 6 is an exploded view of the embodiment of FIG. 5.

FIGS. 5 and 6 illustrate a catcher having five deflecting members 84A, 84B, 84C, 84D and 84E. The fluid stream enters the housing body 85 and strikes deflecting member 84A. The fluid stream deflects off of deflecting member 84A and strikes deflecting member 84B that is disposed in the housing body 85 so as to generally face deflecting member 84A and deflecting member 84C. Deflecting member 84B blocks portions of the fluid stream from moving across the housing body 85. Deflecting member 84C receives the fluid stream from deflecting member 84B and further deflects the fluid stream to deflecting member 84D. Deflecting member 84E is disposed proximate the outlet and inhibit wear upon portions of the housing body 85 proximate the outlet such as an outlet screen 87. As in the previous embodiment, the deflecting members 84A-84E are identical allowing each to be repositioned as desired wherein the deflecting members 84A-84E can each be rotated, flipped and swapped with another deflecting member as desired.

FIG. 6 illustrates guard plates 88A and 88B that generally conform to the inner back wall 89 of the body 85 and a cover 90, respectively. The guard plates 88A and 88B each include a notch 92A, a slot 92B and edge 92C, an edge 92D and a slot 92E, that comprise structures to fix the position of deflecting members 84A-84E, respectively. The structures 92A-92E correspond to recesses (not shown) but similar to recesses or grooves 50 described above; however, if desired, the structures 92A-92E may provide enough support for the deflecting members 84A-84E such that grooves in the body 85 and cover 90 may not be necessary. The guard plates 88A and 88B can be made from any suitable material such as stainless steel or more resistant material such as boron carbide or the like.

The catcher of FIG. 6 also includes a receiver 94 mounted to the housing body 85. The receiver 94 receives the fluid stream and directs it into the housing body 85. Unlike the receiver 30 described above, the receiver 94 has a slot 95 defined by perimeter edge 96 and a width 95A longer than a depth 95B. The perimeter edge 96 has tapered or beveled surfaces that direct the fluid stream into the slot 95. The housing body 85 includes an aperture 97 also comprising a slot similar to slot 95. Generally, the catcher moves along with the nozzle in a direction parallel to slot 95. The slot 95 is particularly advantageous because the fluid stream has a portion (tail) that generally deflects in a direction opposite to the motion of the catcher. The slot 95 in the receiver 94 allows the portion that generally deflects in the direction opposite to the motion of the catcher to be caught in the slot 95 and directed downwardly into the housing body 85. The deflecting members 84A-84E having flat planar surfaces accommodates the different positions that the fluid stream may have when directed downwardly through the receiver 94 and into the housing body 85. Like the receiver 30 the receiver 94 can be made of a wear resistant material such as that described above.

Figure 7:
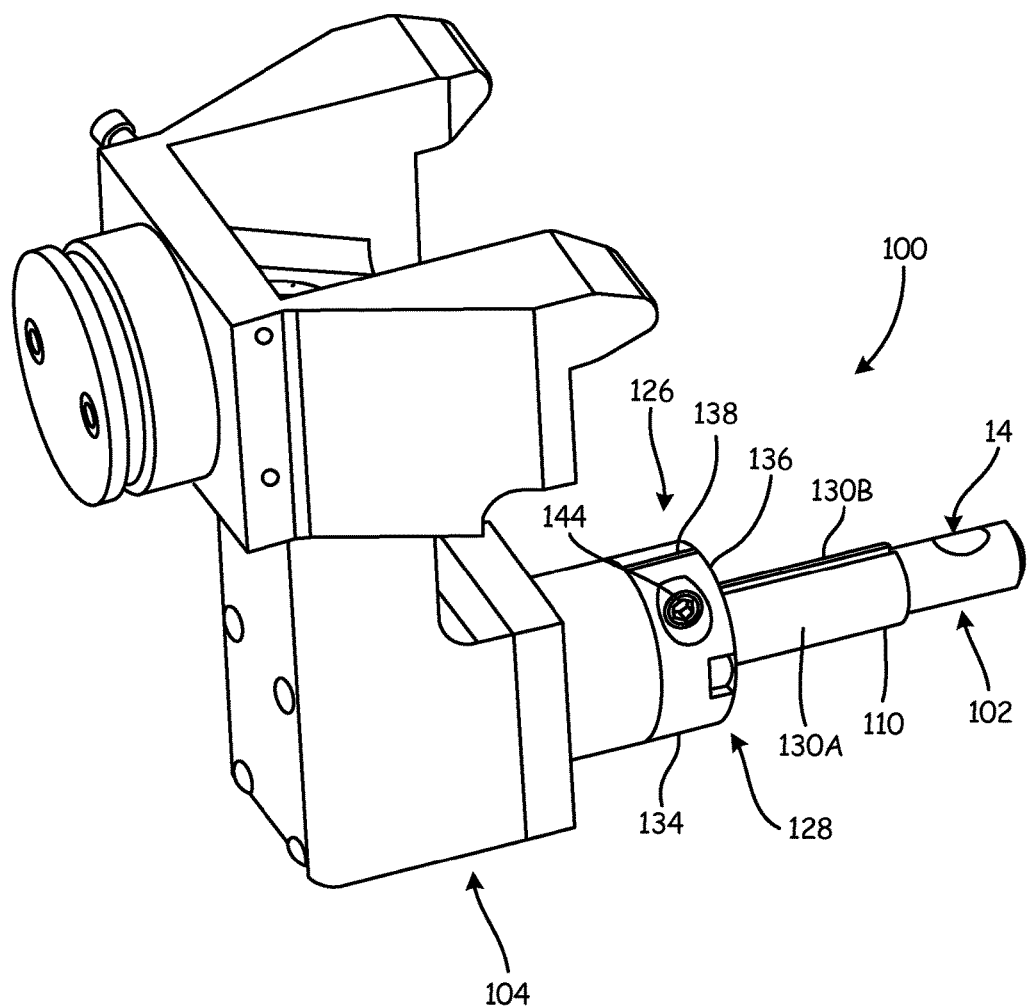
FIG. 7 is a perspective view of another embodiment of a catcher.
Figure 8:
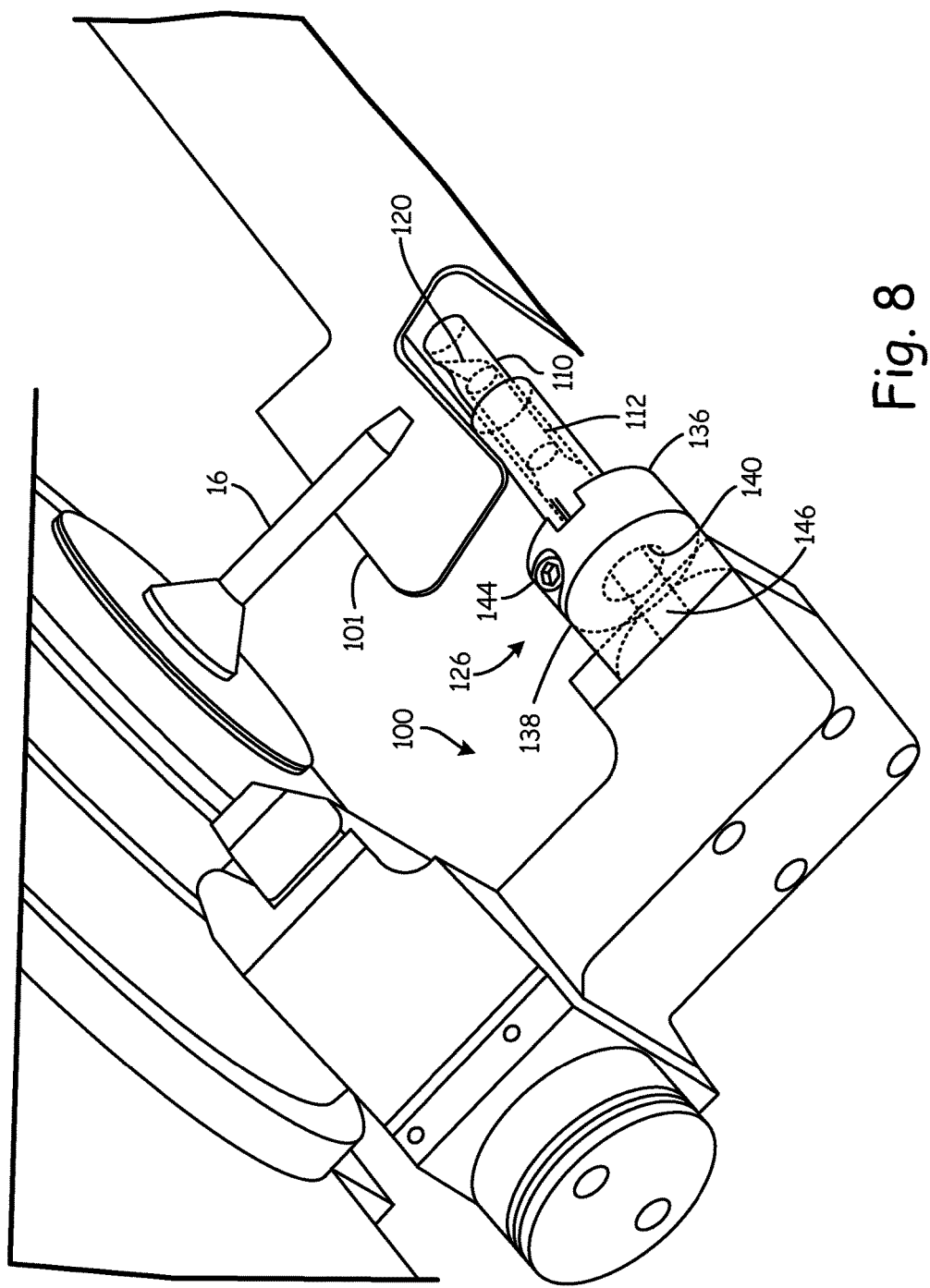
FIG. 8 is a perspective view of the embodiment of FIG. 7.
Figure 9:
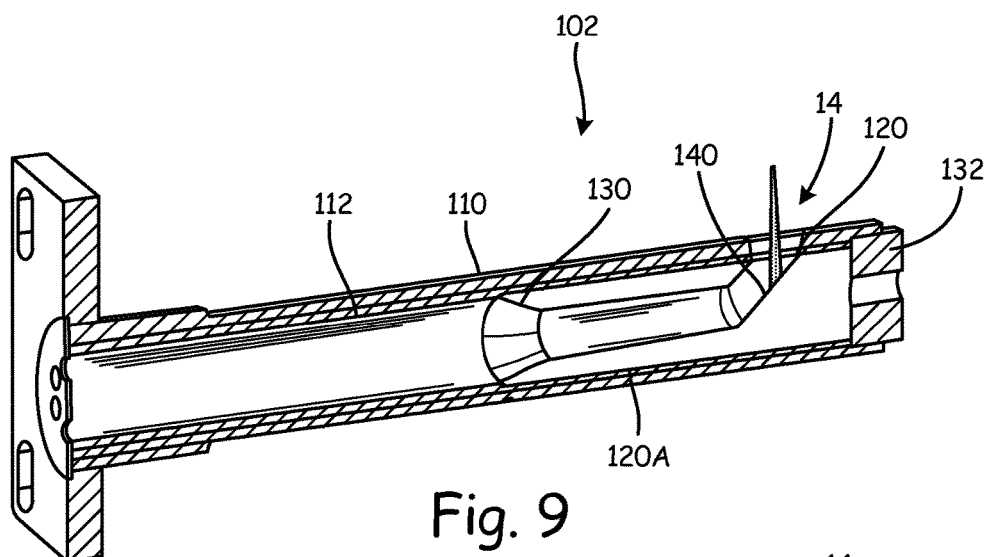
FIG. 9 is sectional view of a portion of a housing of the embodiment of FIG. 7.

Another version of a fluid stream catcher 100 is illustrated in FIGS. 7 and 8. The fluid catcher 100 includes a receiving housing assembly 102 and a mount 104. The receiving housing assembly 102 includes the aperture 14 as described above. In the embodiment illustrated, the receiving housing assembly 102 comprises a tube 110 having an inner bore 112 (see also FIG. 9) along a substantial length thereof opening to aperture 14. As illustrated in FIG. 8, embodied as an elongated tube, the tube 110 allows the catcher 100 to be used in situations where the material or workpiece 101 being cut would contact a larger catcher, such as catcher 10 described above. The elongated nature of the tube 110 allows it to be inserted in confined situations. The diameter of the tube 110 and the length thereof can be varied as needed depending on the workpiece to be machined and, typically the space limitations present.

In one advantageous embodiment, a connecting passageway 120 that connects the aperture 14 to the bore 112 is not at a right angle or extending radially from a center axis of a bore to the outer surface at 90 degrees, but rather, is oriented so as to be at an angle with respect to the longitudinal axis, or in other words, is oriented so as to be oblique, which as used herein is neither perpendicular or parallel. The passageway 120 leads to a passageway 120A formed in an insert 140, the passageway 120A being fluidly coupled to bore 112. The surfaces of passageways 120 and 120A being inclined or oblique to the fluid stream entering the housing though aperture 14 dissipates energy in the fluid stream and typically wear over time.

In one embodiment, the tube 110 having the insert 140 therein is also a nozzle used in cutting, but as used in the present embodiment is a fluid receiver. In one embodiment, the insert is 140 is made from a composite carbide, for example being made of ROCTEC® 500 material. The tube 140 can be held in position between an inner flange 130 present in the tube 110 and an end cap 132 secured to tube 110 in a fixed or removable manner to allow the insert 140 to be replaced if desired.

Referring back to FIG. 7, the tube 110 is mounted in a clamping assembly 126 that includes a tube receiver 128 having clamping sleeves 130A and 130B. The clamping assembly 126 provides a quick and convenient assembly to replace the tube 110 when needed. The clamping sleeves 130A and 130B can be clamped together using any suitable clamp such as the split ring clamp 134 that includes a ring member 136 having a slot 138. An inner diameter 140 of the ring member 136 is reduced by turning a fastener 144 such as a threaded bolt. A center bore 146 through the mount 104 and clamping assembly 126 fluidly connects to the bore 112 of the tube 110. A vacuum is drawn through the mount 104 in a manner similar to that described above in order to remove the fluid and workpiece materials cut by the fluid steam from the fluid stream catcher 100. The inner walls of the oblique passageway 120 deflect the fluid stream from the nozzle in order to dissipate energy contained in the fluid stream.

Figure 10:
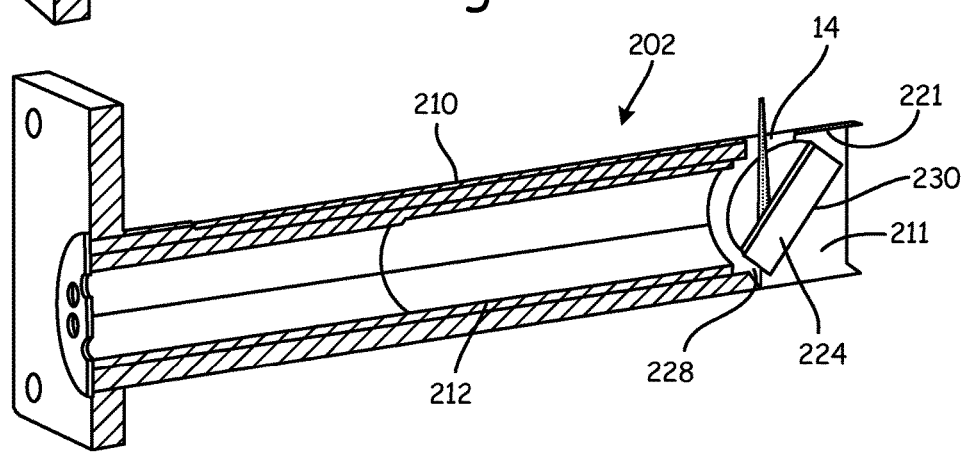
FIG. 10 is a sectional view of a portion of another housing of the embodiment of FIG. 7.

In another embodiment of a fluid stream catcher 100 comprises a receiving housing assembly 202 (FIG. 10), herein also being a tube 210 having an inner bore 212 along a substantial length thereof opening to aperture 14. The receiving housing assembly 202 also includes a deflecting member 224 oriented so as to deflect the fluid stream received through aperture 14 down the bore 212. Oriented in this manner, the deflecting plate 224 dissipates a significant amount of energy in the fluid stream. In an advantageous embodiment, the deflecting plate 224 is replaceable. An access aperture 221 herein on an end of the tube 210 allows the deflecting member 224 to be removed and replaced when needed. An end cap 211 can be fixedly or removably secured to an end of the tube 210 (to allow deflecting plate 224 to be replaced), where an inner support surface 230 of the end cap 211 is configured to hold the deflecting member 224 at the desired angle below the aperture 14. An inner flange 228 in the tube 21 limits movement of the deflecting member 224 within the tube 210 and together with end cap 211 hold the deflecting member 224 securely within the tube 210.

In another embodiment of a fluid stream catcher 300 comprises a receiving housing assembly 302 (FIG. 11), herein also being a tube 310 having an inner bore 312 along a substantial length thereof opening to aperture 14. The receiving housing assembly 302 also includes a deflecting member 324 herein embodied more as a plug. The deflecting member 324 can include a notch or inclined surface 326 that is oriented below aperture 14 so as to deflect the fluid stream received through aperture 14 down the bore 312.

The bore 312 can be fluidly coupled to or comprise passageways 342 formed in one or more inserts 340, of which in the illustrated embodiment comprises three, although more or less inserts 340 (including none) can be used as desired. The deflecting member 324 and insert(s) 340, if present, can be replaced as needed if an end cap 346 is removably secured to an end of tube 310.

Optionally as illustrated, insert(s) 350 can be disposed between the inserts 342 if desired. Each of the inserts 350 includes one or more bores 352 to dissipate energy and/or control the fluid stream through the tube 310. The insert(s) 350 can also be replaced if needed.

Figure 11:
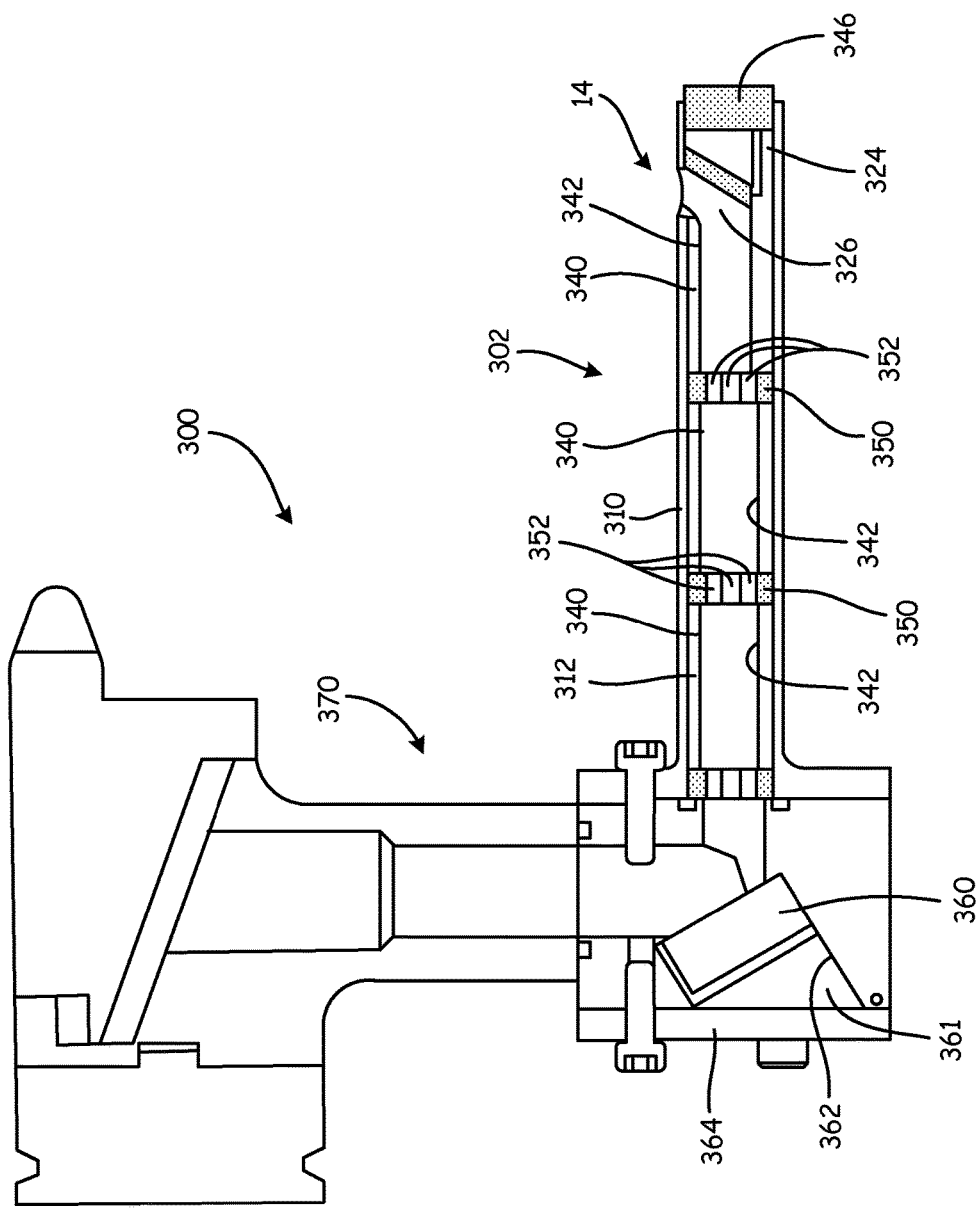
FIG. 11 is a sectional view of another embodiment of a catcher.

Also optionally illustrated in FIG. 11 is a further deflecting member 360 that can be oriented in a mount 370 so as to receive the fluid stream exiting tube 310 with or without the insert(s) 340 or insert(s) 350. The deflecting member 360 is secured in an inclined manner with a holder 361 so as to further deflect the fluid stream and dissipate energy therein. The deflecting member 360 can be replaced if necessary or as desired through an access aperture 362, where a removable cover 364 holds the holder 361, and thereby, the deflecting member 360 in position.

It should be noted that any of the members upon which the fluid stream impinges upon or is directed through (in the invention herein described through the illustrative embodiments described above) such as but not limited to the receivers, inserts, deflecting members or deflecting plates can be made from known and suitable material such as but not limited to boron carbide, tungsten carbide and composites such as ROCTEC® 500 or ROCTEC® 100.

Figure 12:
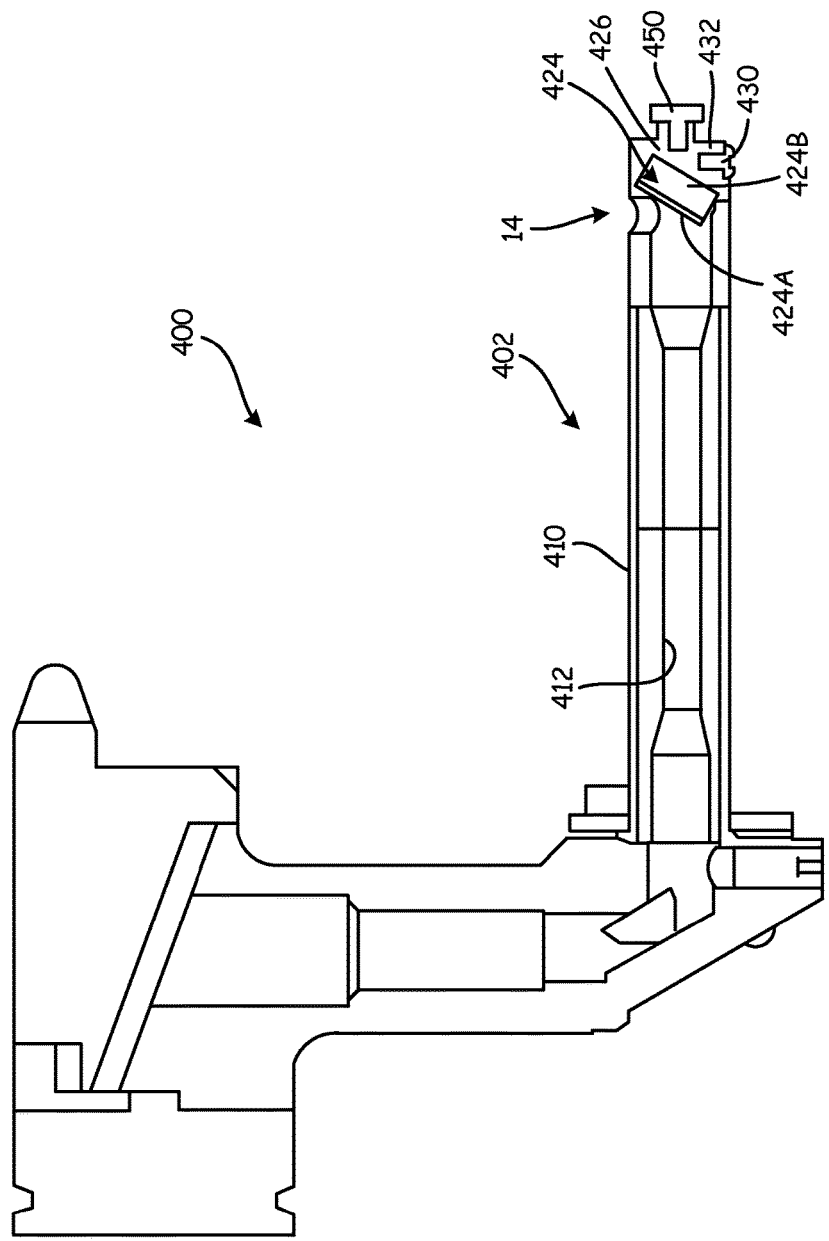
FIG. 12 is a sectional view of another embodiment of a catcher.
Figure 13:
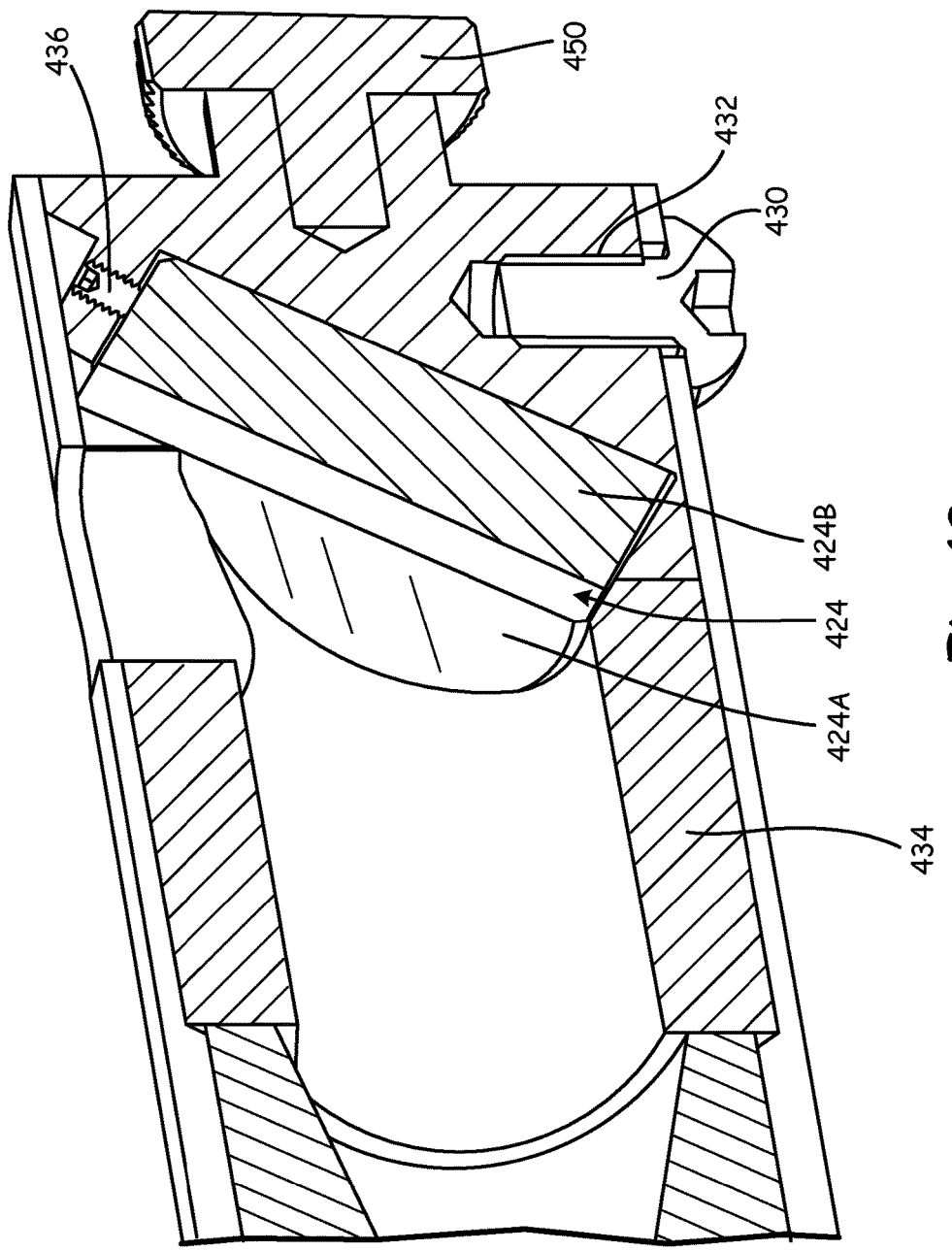
FIG. 13 is a perspective view of a portion of the embodiment of FIG. 12.

In another embodiment of a fluid stream catcher 400 comprises a receiving housing assembly 402 (FIG. 12), herein also being a tube 410 having an inner bore 412 along a substantial length thereof opening to aperture 14. The receiving housing assembly 402 also includes a deflecting member 424 herein embodied as a disc similar to disc 224 of FIG. 10. In the illustrated embodiment, deflecting member 424 includes a first portion 424A and a second portion 424B. First and second portions 424A and 424B may both be formed of a same material or may each be formed of different materials. The deflecting member 424 is held an oblique or inclined angle with respect to the fluid stream entering the housing assembly 402 through aperture 14. The disc 424 is inserted in an end of the housing assembly 402 and is supported by a support 426 having an inclined support surface 428. Referring also to FIG. 13, the support 426 is held in a proper position by a set screw 430 extending through an aperture 432 in the housing assembly 402 and secured to support 426. Like the deflecting members 24A-24C and 84A-84E the disc 424 has a perimeter edge configured to allow the deflecting member 424 to be rotated in different positions, which in this manner can allow all portions of the surface of the deflecting member 424 to be used. The support 426 holds the deflecting member 424 from behind at the desired angle and against an inner portion of the bore 412 such as an end of an insert 434. A set screw 436 is used to apply a force upon the deflecting member 424 to push it firmly against the insert 434 so as to lock the deflecting member 424 in a desired position although the deflecting member 424 is of a constant radius.

Figure 14:
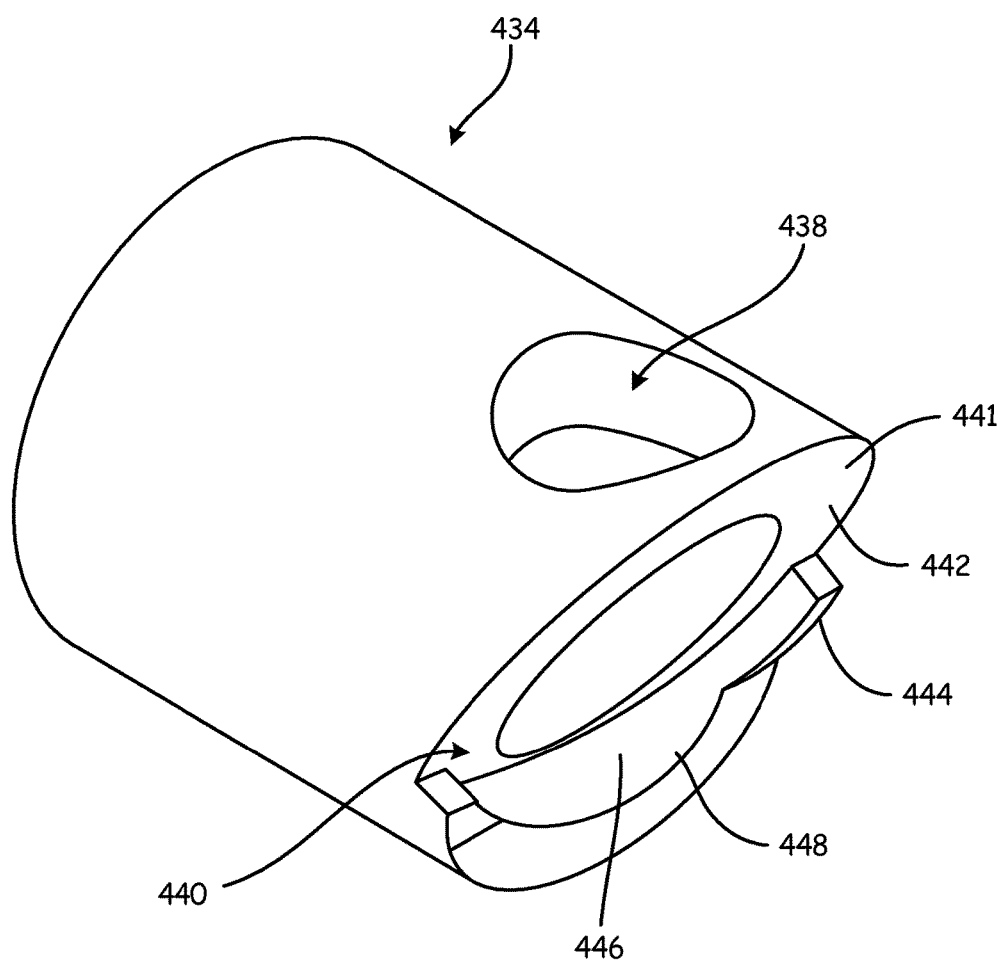
FIG. 14 is a perspective view of an insert of the embodiment of FIG. 12.
Figure 15:
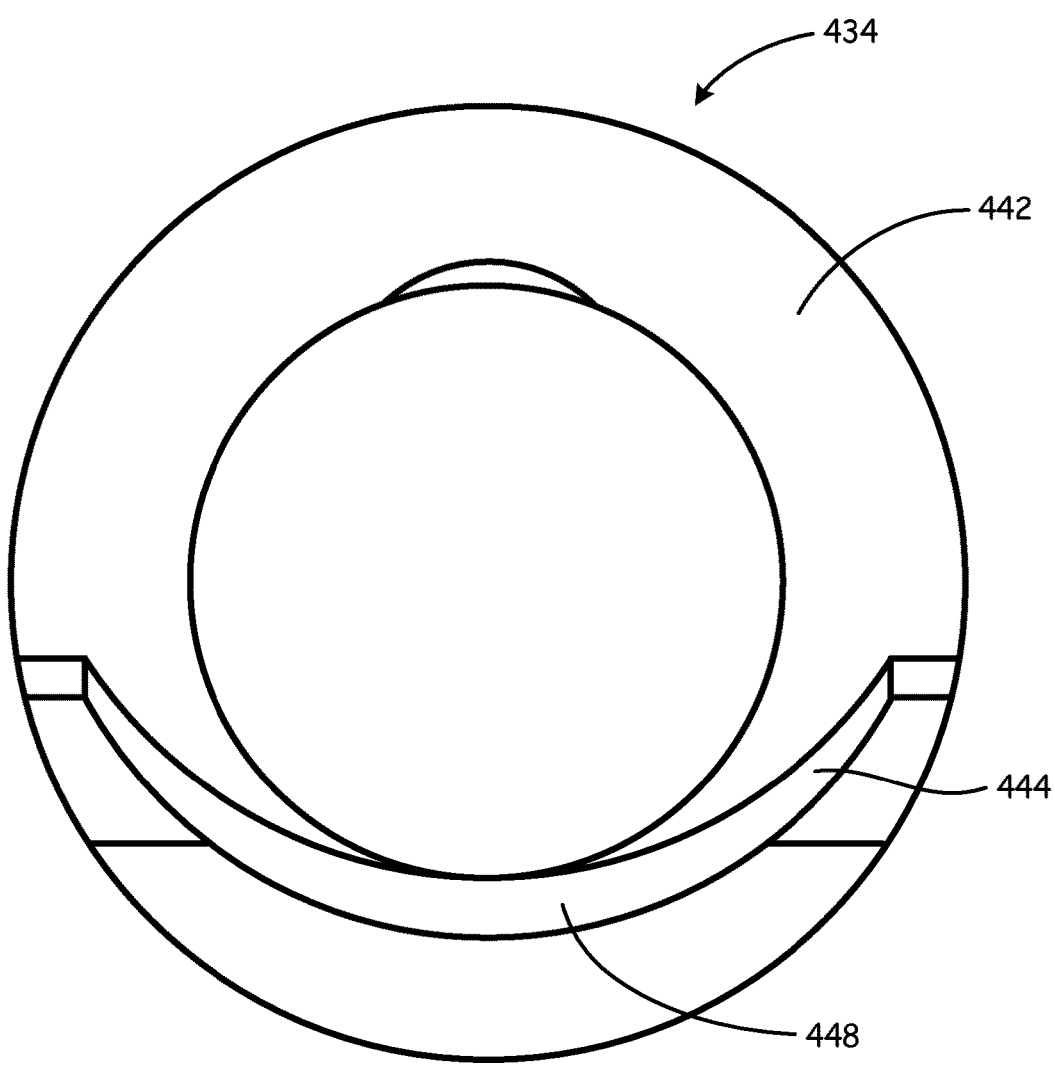
FIG. 15 is an end view of the insert of FIG. 14.

Referring to FIGS. 14 and 15, the insert 434 is generally cylindrical having an aperture 438 that is aligned with the aperture 14 of the housing assembly 402. The insert 434 has a notch 440 that is configured to receive a portion of the deflecting member 424 so as to locate a portion of the deflecting member 424 below the aperture 438 and aperture 14. The notch 440 is formed by an end surface 441 and a protruding or outwardly extending partial rim 444. The end surface 440 comprises a partial portion 442 of a rim, the portion 442 defined by a plane that is oblique to a center axis of the general cylindrical shape of the insert 434. The partial rim 444 extends axially from the end surface 440 and forms a partial cylindrical surface 446 that is configured to support a lower portion of the deflecting member 424. A lowermost portion 448 of the partial rim 444 lies in a plane that is orthogonal to the center axis of the insert 434 so as to provide an abutment surface that engages an end of the support 426. An end of the support 426 on a side opposite the inclined surface 428 can have a structure 450 configured to allow or at least aid in the removal of the support 426 from the housing assembly 402. In the embodiment illustrated, the structure 450 comprises a disc providing a circular flange. In the embodiments described in connection with FIGS. 12 through 15, disc 224, support 426 and insert 434 cooperate with each other to orient aperture 438 in line with aperture 14 when set screw 430 is positioned to lock support 426 in place.

It has been discovered that another material previously not known to have been used in catchers exhibits excellent wear resistant characteristics. In particular, it has been found that polycrystalline diamond (PCD) when used on a deflecting surface to dissipate energy of the fluid stream will not wear as quickly as other materials previously used in catchers. The deflecting members or plates 24A-24C, 84A-84E, 224, 324, 350, 360 and 424 all can comprise a surface receiving the fluid stream that is formed from polycrystalline diamond. Commonly, the polycrystalline diamond is formed as a layer over a support layer such as but not limited to tungsten carbide. In the case of deflecting member 324, notch 326 can be a notch in the polycrystalline diamond layer. Receivers and inserts 30, 30A, 30B, 140 and 340 also described herein can also include an outer surface formed of polycrystalline diamond.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A waterjet stream catcher for catching a fluid stream discharged from a nozzle, the catcher comprising:
   a replaceable wear resistant component made form a wear resistant material; and
   a housing configured to mount to and move with the nozzle, the housing having an aperture configured to receive a fluid stream in the housing, the housing having at least one structure configured to support the replaceable wear resistant component, the wear resistant component having a portion configured to cooperate with a structure of the housing and hold the wear resistant component in a first selected orientation and fixed position with respect to the aperture to deflect the fluid stream in a selected direction within the housing; wherein:
   the wear resistant component comprises a deflecting member having a planar surface, and engagement of the deflecting member with the structure orients the planar surface underneath the aperture in the first selected orientation in a fixed oblique position with respect to the fluid stream discharged from the nozzle to deflect, at a first portion of the planar surface, the fluid stream in a selected direction within the housing; and
   the deflecting member is rotatable and configured to cooperate with the structure in a second selected orientation in the fixed oblique position with respect to the aperture to deflect the fluid stream at a second portion of the planar surface.

2. The catcher of claim 1 wherein the deflecting member comprises a disc.

3. The catcher of claim 1 wherein the housing includes a bore, the deflecting member configured to deflect the fluid stream down the bore.

4. The catcher of claim 1 wherein the deflecting member includes a second planar surface, wherein the planar surface is oriented to receive the fluid stream when the deflecting member is mounted in the first selected orientation and the fixed oblique position in the housing, and the second planar surface is oriented to receive the fluid stream when the deflecting member is mounted in a third selected orientation and the fixed oblique position in the housing.

5. The catcher of claim 4 wherein the deflecting member is block shaped wherein the planar surface and the second planar surface face in opposite directions.

6. The catcher of claim 5 wherein the deflecting member has perimeter sides of equal length, each perimeter side being oriented orthogonal to the planar surface.

7. The catcher of claim 6 wherein the deflecting member has four perimeter sides.

8. The catcher of claim 1 wherein the deflecting member is configured to be repositionable to any one of a plurality of positions, wherein the at least one structure holds the deflecting member in each of the plurality of positions.

9. The catcher of claim 1 and further comprising a second deflecting member, and wherein the housing includes at least one second structure configured to support the second deflecting member in a selected orientation and fixed position, the structure and the second structure configured to support the deflecting member and the second deflecting member, respectively, to receive the fluid stream from the aperture and direct the fluid stream to the second deflecting member.

10. The catcher of claim 9 wherein the deflecting member and the second deflecting member are of size and shape so as to be interchangeable within the housing.

11. The catcher of claim 1 wherein the planar surface of the deflecting member is made of polycrystalline diamond.

12. The catcher of claim 1 and further comprising:
   a receiver having a slot configured to receive the fluid stream and direct the fluid stream into the aperture, the slot having a width dimension longer than depth dimension being coplanar with the width dimension.

13. The catcher of claim 1, wherein the planar surface of the deflecting member is exposed to the fluid stream, and a position of the aperture of the housing is offset relative to a center of the planar surface.

14. A waterjet stream catcher for catching a fluid stream discharged from a nozzle, the catcher comprising:
   first and second deflecting members each including a plurality of planar surfaces, the first deflecting member including a first planar surface, and the first planar surface including a first portion that deflects the fluid stream;
   a housing configured to mount to and move with the nozzle, the housing having an aperture to receive the fluid stream, the housing including a first structure to hold the first deflecting member in a first fixed position at an oblique angle with respect to the fluid stream and to direct the fluid stream to the second deflecting member, the housing having a second structure to hold the second deflecting member in a second fixed position at an oblique angle with respect to the fluid stream deflected from the first deflecting member; and wherein the first deflecting member is configured to be repositionable so that a second portion of the first planar surface deflects the fluid stream.

15. The catcher of claim 14 wherein each of the deflecting members are replaceable.

16. The catcher of claim 15 wherein the deflecting members are interchangeable within the housing.

17. The catcher of claim 14, wherein the plurality of planar surfaces of the first deflecting member further includes a second planar surface, and the plurality of planar surfaces of the second deflecting member includes third and fourth planar surfaces.

18. The catcher of claim 17 wherein each of the first and second deflecting members is block shaped wherein the planar surface and the second planar surface face in opposite directions, and the third planar surface and the fourth planar surface face in opposite directions.

19. The catcher of claim 18 wherein each of the first and second deflecting members has perimeter sides of equal length, each perimeter side being oriented orthogonal to respective planar surfaces of the first and second deflecting members.

20. The catcher of claim 19 wherein each of the first and second deflecting members has four perimeter sides.

21. The catcher of claim 17 wherein each of the first and second deflecting members is configured to be supported in any one of a plurality of positions by the corresponding first and second structures.

22. The catcher of claim 17, wherein one of the first and second planar surfaces of the first deflecting member is exposed to the fluid stream, and a position of the aperture of the housing is offset relative to a center of the one planar surface of the first deflecting member that is exposed to the fluid stream.

23. A waterjet stream catcher for catching a fluid stream discharged from a nozzle, the catcher comprising:

a first deflecting member made from a wear resistant material and having a planar surface; and a housing with an aperture to receive the fluid stream so that the fluid stream is offset from a centerline bisecting the first deflecting member, the housing including a first structure having a first slot configured to receive and hold a first end of the first deflecting member at an oblique angle with respect to the fluid stream; and wherein the first deflecting member is configured to be repositionable to any one of a plurality of positions so that different portions of the planar surface deflect the fluid stream.

24. The catcher of claim 23, wherein the first structure of the housing includes a second slot located on an opposing side of the housing from the first slot, the second slot configured to receive and hold a second end of the first deflecting member at an oblique angle with respect to the fluid stream.

25. The catcher of claim 24, wherein:

the catcher includes a second deflecting member made from a wear resistant material;

and the housing includes a second structure having a third slot configured to receive and hold a first end of the second deflecting member at an oblique angle with respect to the first deflecting member.

26. The catcher of claim 25, wherein the second structure of the housing includes a fourth slot located on an opposing side of the housing from the third slot, the fourth slot configured to receive and hold a second end of the second deflecting member at an oblique angle with respect to the first deflecting member.

27. The catcher of claim 26, wherein the first and second deflecting members each include opposing first and second planar surfaces.

28. The catcher of claim 27 wherein each of the first and second deflecting members has perimeter sides of equal length, each perimeter side being oriented orthogonal to the first and second planar surfaces.

29. The catcher of claim 28 wherein each of the first and second deflecting members is configured to be supported in any one of a plurality of positions by the corresponding first and second structures.

30. The catcher of claim 29, wherein a position of the aperture of the housing is offset relative to a center of the planar surface of the first deflecting member that is exposed to the fluid stream.

31. The catcher of claim 23, wherein the first structure holds the first deflecting member in each of the plurality of positions.

* * * * *